United States Patent

[11] 3,563,504

| [72] | Inventors | Harry K. Gordon<br>402 N. 46th;<br>Dennis H. Baerwald, 773 N. 74th, Seattle, Wash. 98103 |
|---|---|---|
| [21] | Appl. No. | 804,545 |
| [22] | Filed | Mar. 5, 1969 |
| [45] | Patented | Feb. 16, 1971 |

[54] DIE-CAST CABLE PANS
3 Claims, 6 Drawing Figs.

[52] U.S. Cl. ................................................ 248/68; 248/70
[51] Int. Cl. .................................................. F16l 3/22
[50] Field of Search ........................................ 248/68, 69, 74

[56] References Cited

UNITED STATES PATENTS

| 1,344,514 | 6/1920 | Lessells .................... | 248/68 |
| 2,365,620 | 12/1944 | Banneyer .................. | 248/68 |
| 2,964,274 | 12/1960 | Richardson ............... | 248/68 |
| 2,939,664 | 6/1960 | Wesseler .................. | 248/68 |

FOREIGN PATENTS

| 1,040,505 | 8/1966 | Great Britain ............ | 248/74 |

Primary Examiner—Chancellor E. Harris

ABSTRACT: This invention relates to cable and pipe supporting hangers and hanger supports. The pan is die-cast and is of rectangular cross section at its middle with sides sloping upward from the bottom of the middle portion to form a top portion upon which the cable or pipe rests. The bottom of the pan is attached to a stand off tube which may be welded to a supporting surface.

PATENTED FEB 16 1971 3,563,504
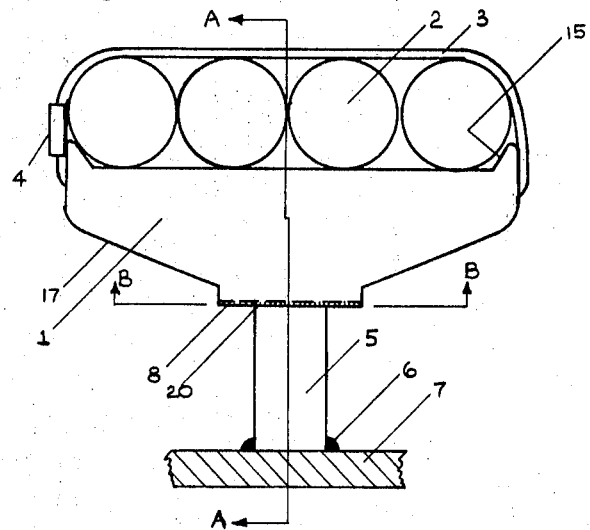
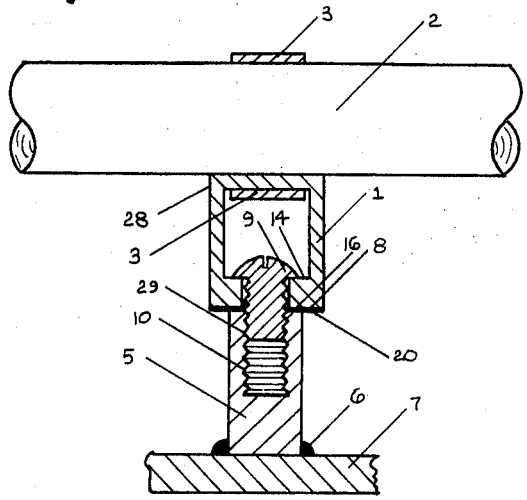
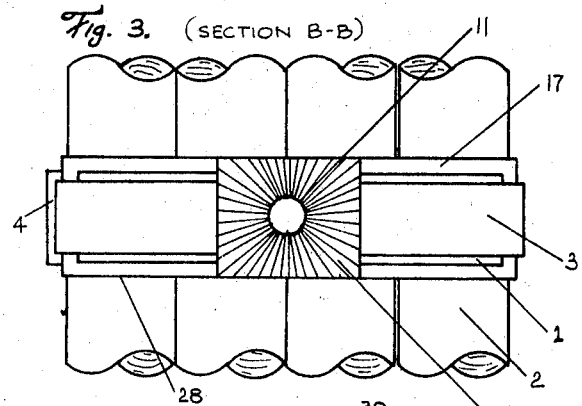
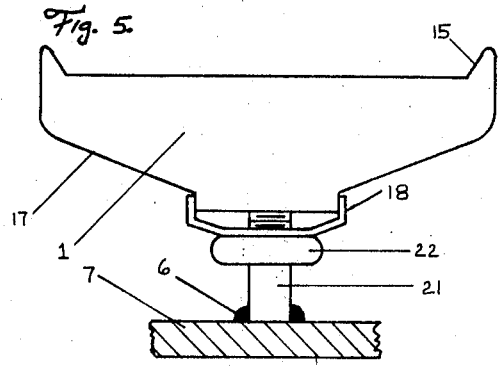
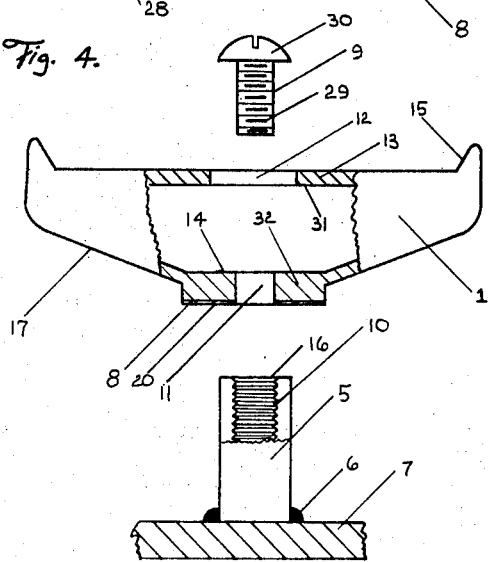
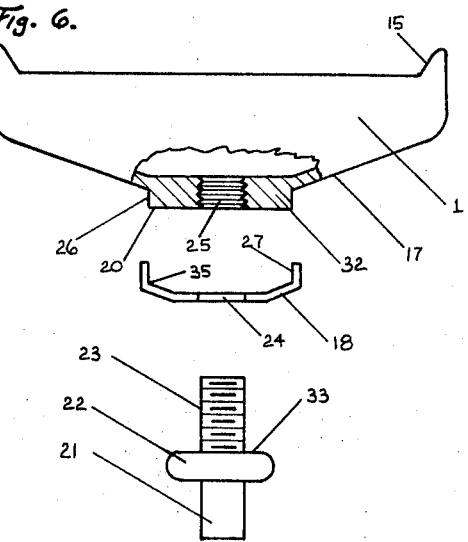
INVENTOR:
Harry M Gordon
Dennis H. Baewald

DIE-CAST CABLE PANS

The purpose of this invention is to provide a simple, economical die-cast pan to be used to hold electrical cables or pipes primarily in ship construction and secondarily in building work. By utilizing a die-cast operation the pans can economically be manufactured in quantity, in several sizes, while maintaining quality control over the finished product such that tolerance uniformity is achieved.

The resultant product has distinct advantages over the presently used pan, which is "handmade" from either tube stock or plate stock. Primarily, the die-cast pan is manufactured such that no alterations have to be made to it during the pan assembly installation. The upper ends of the pan have "-built-in" ferrels (provided by rounded pan edges) and the pan has sloped ends which provide the layman additional room for the banding installation. Thirdly, the die-cast pan has a special surface on its lower face which prevents the pan assembly from loosening and rotating after the installation is completed. For pans which are to be installed upon studs, the die-cast pan has precut threads in its base such that it is immediately ready for installation. Also, for stud installation, the use of a special washer is employed to allow the layman extra rotation of the pan, while maintaining a holding tension on the threads, for proper alignment with cable or pipe runways.

Basically, the die-cast pan is used to hold electrical cable or pipes by providing a supporting surface and a means of attaching the cables to the surface with the complete assembly attached rigidly to a fixed surface by means of either a screw-type fastener or a threaded stud-type fastener. The die-cast pan is made of aluminum (which requires no plating) and is typically 1 inch or less in width (supporting surface width) with variable lengths, ranging from three-fourth inches to 9 inches. The banding material is commonly a steel alloy and provides an adequate hold down force on the pan and tube assembly when properly tightened.

FIG. 1 is an elevation view of the completed pan assembly installation using a screw-type fastener. FIG. 2 is a sectional view of FIG. 1 (section A-A) showing the detailed arrangement of the assembled parts for the screw-type pan attachment. FIG. 3 is also a sectional view (B-B) of FIG. 1, showing the special type of locking surface on the pan base. FIG. 4 is an exploded view of FIG. 1 for the pan assembly with the screw-type base attachment (note that cables 2 and banding 3 have been deleted). FIG. 5 is an elevation view of the pan assembly for the stud-type of attachment. FIG. 6 is an exploded view of FIG. 5 with the tubes and banding also removed for drawing clarification.

As mentioned previously, the die-cast pan is used in both ship building work and commercial building work. However, the primary use of the die-cast pan is found in ship building work where the use of stud attachments to bulkheads and other steel surfaces is common practice. The resultant assembly is therefore applicable to any surface independent of orientation. The advantages of the die-cast pan over the previous type pans are numerous. The older type pans were handmade from square tubing by cutting to length, drilling, and attaching the ferrels to the tubing ends to protect the banding from the sharp tubing corners. In comparison, the die-cast pan has ferrels, or rather well rounded corners which serve as ferrels, cast into the ends, is available in several lengths, and also has the top screw access hole included. Some pans are presently handmade from steel by cutting to length, drilling, and welding an internally threaded button to the pan bottom. The finished assembly must be plated afterwards and also requires the addition of end ferrels. For both of these aluminum and steel tube assemblies the banding installation is complicated and hampered by the presence of the constant tube cross section which reduces the amount of installation clearance necessary for easy banding installation. In contrast, the die-cast pan has approximately 100 percent more clearance room (maximum) while maintaining adequate strength and stability. The present type of pans can be attached to threaded studs also, but due to their small thickness on the bottom pan face, into which the stud threads, they continually tend to loosen up after installation. The die-cast pan has an especially deep base designed to allow for more stud-thread contact and also for holding a special lock washer which both prevents the pan assembly from loosening up but yet allows the pan to be rotated an additional 540° after being initially tightened, to allow for proper pan alignment. The special surface on the bottom of the pan base also prevents the pan assembly from loosening up by increasing the coefficient of static friction (C+) for any normal (perpendicular) surface load.

FIG. 1 is an elevation view of the previously mentioned components for a pan assembly installation using a screw-type fastener. The pan 1 itself is basically rectangular in cross section at the middle (along section line A-A) with a sloping bottom 17 on either side of said middle portion. Line 20 denotes the bottom of said middle portion while line 8 indicates the depth of the specially cut bottom pan face 20. Said pan 1 serves as a supporting surface for cables 2 which are tightly attached to said pan 1 by the banding 3 which is held tight by a standard banding buckle 4, and are further retained by the rounded projections 15 on the upper ends of said pan 1. The pan 1 and cable 2 assembly is held rigid to a fixed surface (bulkhead) 7 by a standoff tube or "button" 5 which is welded 6 to the said fixed surface 7 and furthermore held to the aforementioned pan assembly (pan 1 and cables 2) by a screw 9, as sown clearly in FIG. 2. The threads 29 of the attaching screw 9 engage the threads 10 of said button 5 and when said screw 9 is tightened correctly and sufficiently by engaging a minimum number of said threads 10 the head 30 of said screw 9 produces a compressive and normal force between said screwhead 30 and the upper surface 14 of said bottom side of said pan 1, and also between said pan bottom face 20 and the top face 16 of said button 5. As indicated in FIG. 2 also, the weld 6 ensures a stable and solid connection between said button 5 and said fixed surface (bulkhead) 7. Said compressive and normal force acting between said surfaces 16 and 20 provides rotational stability of said pan 1 due to the specially cut surface 8 of said face 20, due to an increase in the coefficient of static friction (rough surface on smooth surface versus smooth surface on smooth surface) between said surfaces 16 and 20. The sides of said pan 1, denoted as surface 28, provide load carrying strength to said pan 1 enabling said pan 1 to support said cables 2 when attached by said banding 3 as indicated in FIG. 2, where said banding 3 contacts cables 2 and bottom surface 31 of the top 13 of said pan 1. (See FIG. 4 for additional notation). FIG. 3 further indicates correct installation position of banding 3 in relation to said sides 28 of said pan 1 with said banding buckle 4.

FIG. 4 shows the assembly sequence of said components 9, 1, and 5. Said bottom surface 20 of said pan 1 is placed on said top surface 16 of said button 5 with screw hole 11 of said bottom 32 of said pan 1 aligned with said threads 10 of said button 5, such that when said screw 9 is lowered thru hole 12 of said top 13 of said pan 1 such that said threads 29 of said screw 9 will project thru said hole 11 and correctly engage said threads 10 of said button 5.

FIG. 5 is an elevation view of the previously mentioned components for a pan assembly installation utilizing a stud-type fastener. The pan 1 is identical to said pan 1 previously described in line 25, page 3, except that the said special surface 8 of said lower surface 20 of said pan 1 is deleted and the hole 11 is replaced with a threaded hole 25 as best shown in FIG. 6. In FIG. 5, said pan 1 is securely attached to a projecting stud 21 which is rigidly attached to a fixed surface or plane 7 by welds 6. The integral stud "button" 22 of said stud 21 provides a supporting surface 33 for the bottom flat surface 34 of retaining washer 18, as best shown in FIG. 6 which indicates the assembly sequence of said components 1, 18, and 21. Said pan 1 mates with said washer 18 as the sides 26 of the said pan bottom 32 fit against the inside sides 27 of said washer 18 and the corner of said bottom surface 20 mates against the inside corner 35 of said washer 18. Stud hole 24 of said washer 18 aligns with said pan hole 25 of pan bottom 32 such that when pan 1 and washer 18 assembly are placed on the upper threaded portion 23 of said stud 21, said threaded portion 23 projects thru sand washer hole 24 and engages said pan hole threads 25. Said stud threads 23 engage said pan hole threads 25 until said surface 33 of said stud button 22 contacts said surface 34 of said washer 18 and further engage said pan hole threads 25 until the desired pressure is established between said pan 1 and said stud 21 as said pan assembly is rotated and aligned correctly.

We claim:

1. A die-cast pan of various lengths with a rectangular cross section at the middle portion of said pan with sides sloping upward from the bottom of said middle portion with a channel shaped cross section at said sloping sides, and integrally cast holes in the upper and lower surfaces of said pan with the bottom of said pan being definitely thicker than the adjacent sides of said pan and also thicker than the top of said pan with said top having well rounded corners on the lower surface at the ends of said top and furthermore having well rounded projections on the upper ends of said top surface.

2. A die-cast pan as defined in claim 1 wherein a special surface on the lower surface of the bottom of the middle portion of said pan is produced by a milling tool such that definite surface teeth, or striations, are produced with said teeth projecting radially from center of said hole in bottom of said pan and extending to the edges of said base of said middle portion of said pan.

3. A die-cast pan as defined in claim 1 wherein said sides of bottom of said middle portion of said pan mate with a special washer of variable thickness and size corresponding to various sizes of said pan and designed to permit compression deflection at the center of said washer to allow said pan to be rotated approximately 540° after said pan and fitting washer assembly initially make contact on the lower surface of said washer with a mating stud assembly or counterpart which provides male threads to engage in said hole threads of said pan base such that said thread engagement forces said pan and washer assembly together with said stud assembly or counterpart.